F. P. SOUDER.
CONTINUOUS PROCESS COOKER.
APPLICATION FILED MAY 26, 1916.

1,215,212.

Patented Feb. 6, 1917.
4 SHEETS—SHEET 3.

UNITED STATES PATENT OFFICE.

FRANK P. SOUDER, OF BRIDGETON, NEW JERSEY.

CONTINUOUS-PROCESS COOKER.

1,215,212.

Specification of Letters Patent.  Patented Feb. 6, 1917.

Application filed May 26, 1916. Serial No. 100,046.

*To all whom it may concern:*

Be it known that I, FRANK P. SOUDER, a citizen of the United States, and a resident of Bridgeton, Cumberland county, New Jersey, have invented certain Improvements in Continuous-Process Cookers, of which the following is a specification.

My invention relates to cookers of the type employed in the canning art wherein filled cans of vegetables, fruit, and the like, are subjected to a suitable cooking or sterilizing temperature while being conveyed or otherwise moved within a cooking receptacle, usually heated with steam.

The main object of my invention is to provide a structure in which I can economize space and secure efficient action upon a large number of cans; such cans being fed to and removed from the cooker continuously.

A further object of my invention is to distribute the heating medium, in the present instance steam, directly adjacent the respective cans as the latter are moved through the cooker; and a further object of my invention is to employ such steam distributing elements as can moving members. Another object of my invention is to provide troughs or pans capable of holding water and having tracks or ways upon which the cans may move so that the cans, in addition to being heated by steam, will be moved around in a hot water bath in which they will be partially submerged.

These and other features of my invention are more fully described hereinafter, reference being had to the accompanying drawings, in which:

Figs. 4 and 5, are enlarged views illustrating details of my invention.

Figure 1:
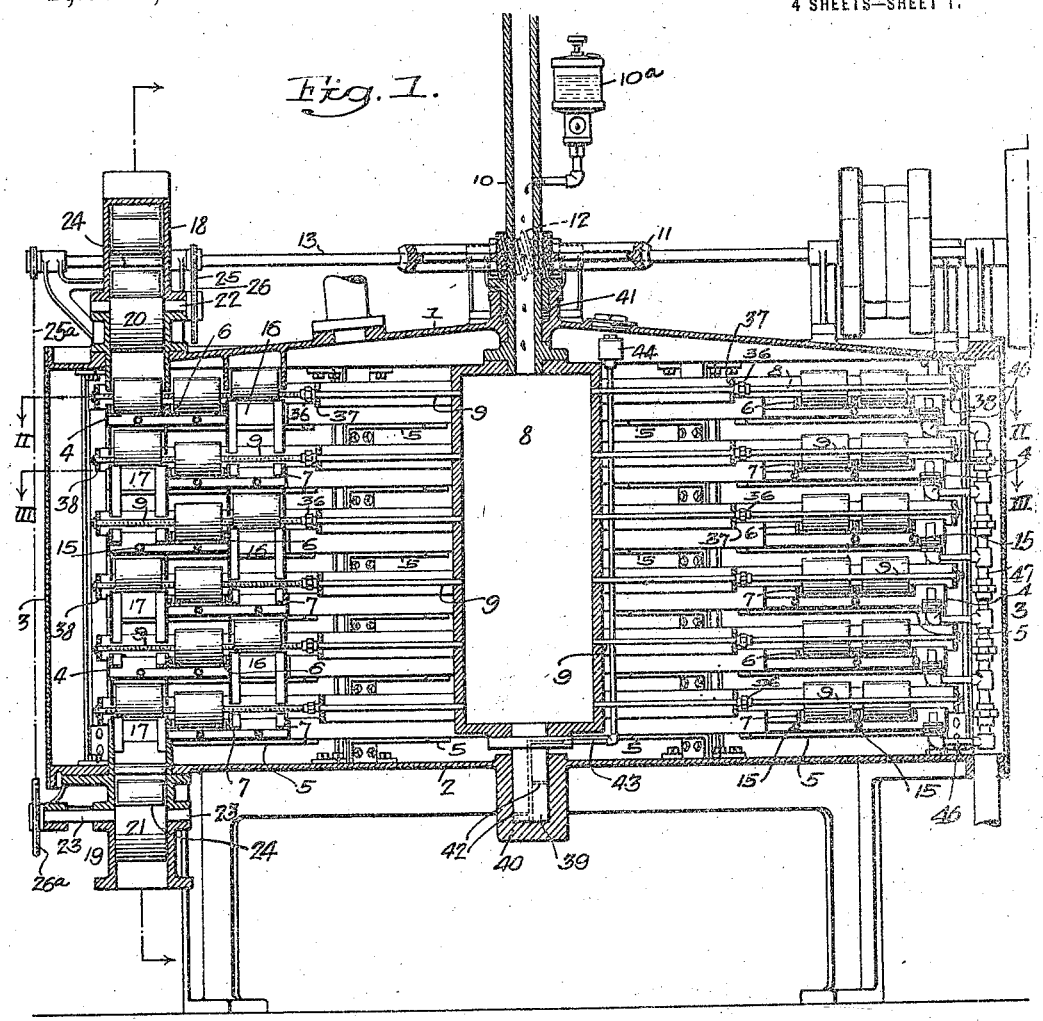
Figure 1, is a sectional elevation of my improved cooker on the line I—I, Fig. 2.
Figure 2:
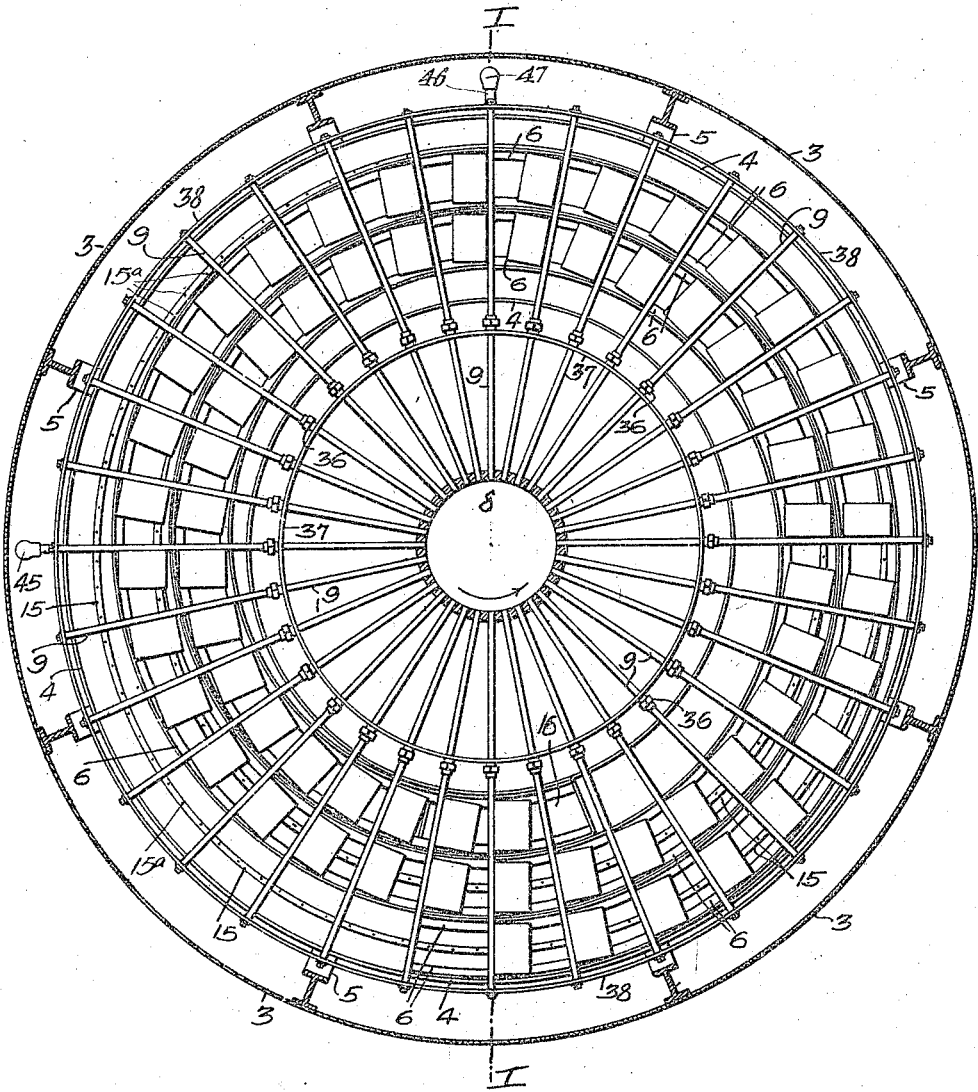
Fig. 2, is a sectional plan view on the line II—II, Fig. 1.
Figure 3:
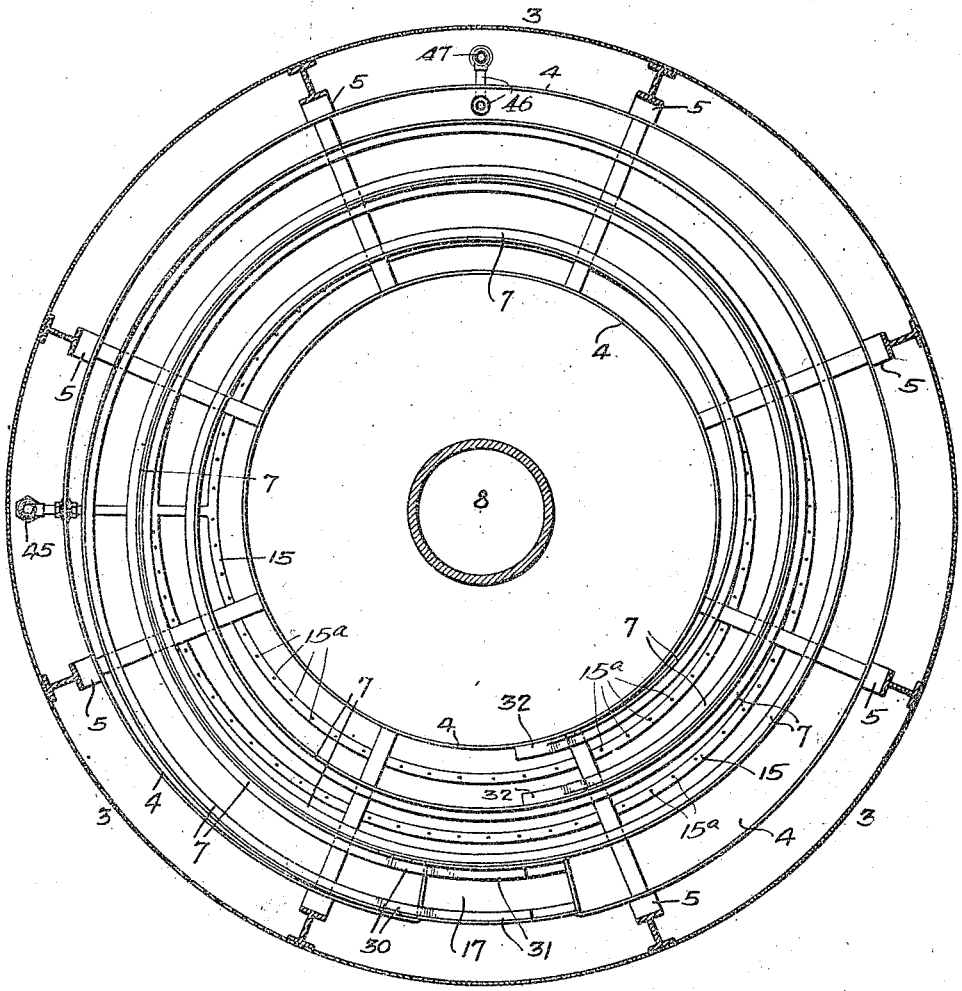
Fig. 3, is a sectional plan view on the line III—III, Fig. 1.

Differing somewhat from continuous process cookers of the usual type, my improved cooker uses both water and steam at the same time, as there is no necessity for providing the cooker with air-tight connections or providing fluid seals at the inlet and exit points for the cans. It will be understood, however, that the cooker may be made steam-tight for the reception of such heating fluid under pressure, if so desired.

Within a suitable casing, which may consist of cover and bottom plates 1 and 2, respectively, and a cylindrical outer wall 3, I provide a series of horizontally disposed annular troughs 4, which are supported by brackets 5 and are adapted to receive water. A series of eccentric or helical track-ways 6 and 7 for the cans are mounted in each of these troughs, and centrally disposed with respect to the troughs and tracks, I mount a rotating steam delivery drum 8, carrying tubular arms 9 extending radially of the structure and overlying the several troughs and the tracks within the same.

This drum may have a steam inlet pipe or connection 10 projecting through the cover plate 1 of the casing structure, which pipe 10 may be connected with a steam pipe leading from a source of supply, by a suitable slip joint (not shown). The pipe 10 is preferably provided with a sight oiler $10^a$ whereby oil may be dropped at regular intervals into the body of steam within the steam chamber sufficient in quantity to pass out with such steam in a manner hereinafter described to oil the cans in process of cooking whereby I am enabled to prevent the surface of such cans rusting.

Secured to the steam inlet connection 10, which rotates with the drum 8, is a worm wheel 11 driven by a worm 12 on a suitable shaft 13 to which motion may be imparted by any suitable means (not shown), whereby the drum and the tubular arms radiating therefrom may be rotated for a purpose to be described.

This gearing may be proportioned one to twenty-five; that is to say, the drum with its arms may be turned once for every twenty-five revolutions of the worm. Generally speaking, the worm gear will have teeth equal in number to the number of cans on each annular row of the cooker spaced by the pusher arms of the steam drum, and changes in the number of pushers and therefore in the number of cans moved in the cooker in one complete revolution of the steam drum 8 may be made as desired.

Within the casing I arrange several sets of trackways or can supports, each set being in the form of a convolute or spiral; the tracks 6 being arranged or disposed for moving the cans inwardly and the tracks 7 being arranged or disposed for moving the cans outwardly so that the cans in their passage through the cooker will be subjected to an inward or outward movement as well as a substantially circular movement. By this means I am enabled to treat a larger number of cans than would be possible with machines as ordinarily arranged, where the cans are moved in truly circular arcs and where one or more rows of cans are arranged to be moved.

The several trackways 6 and 7, are disposed in the troughs 4, which have walls at a suitable height to receive a quantity of water in which the cans will be partially submerged, and these troughs may receive steam pipes 15 whereby such water may be heated. The trackways 6 and 7 for the cans are disposed above the steam pipes, and they may be supported in any suitable manner.

The rails of the tracks may be of suitable angle iron, and the uppermost trackway of all, which first receives the cans, is arranged to move the cans inwardly to an opening 16 in the upper trough adjacent and beyond the inner terminal of such track and through which the cans drop onto the second track, which is arranged to move the cans outwardly until another opening 17 is reached through which the cans drop onto the third trackway, which is of the type of the first or uppermost track, and so on throughout the cooker.

Figure 4:
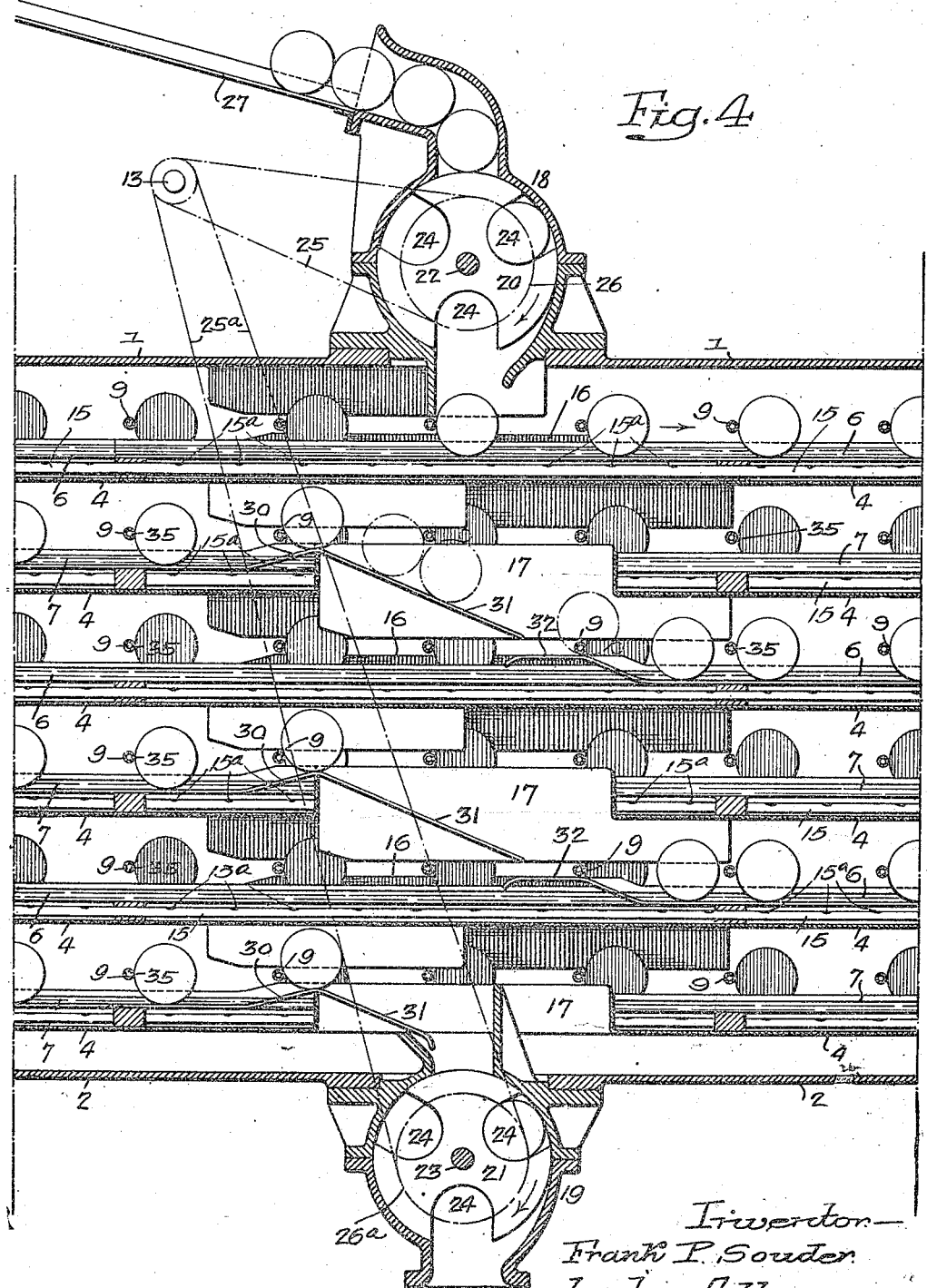

The cans may be delivered to and removed from the machine by means of rotary valve structures, as illustrated in Fig. 4, in which casings 18 and 19 are provided at top and bottom of the main cooking chamber, within which are mounted the valves 20 and 21 on shafts 22 and 23; the valves being provided with a plurality of pockets 24; in the present instance, three in number.

From the main driving shaft 13, a chain or other belt 25 may extend to a pulley 26 on the shaft 22 of the upper valve structure, and in like manner a similar driving connection comprising a chain or other belt 25$^a$ may extend to a pulley 26$^a$ on the shaft 23 of the lower valve structure.

The upper valve structure may be arranged to receive cans from a trough 27 and deliver the same to the outer run of the upper trackway 6 within the upper trough 4, where they are engaged successively by the tubular arms 9 carried by the central steam drum 8, and moved around the trackway within said trough until the opening 16 at the inner end of said track is reached, whereupon the cans are discharged through the same to the trackway 7 in the trough immediately below.

As may be readily understood, it is necessary to elevate the cans out of the troughs in order to avoid discharge of the liquid therein, and for this purpose the discharge ends of the respective tracks are arranged as illustrated in Fig. 4, in which a portion 30 is shown as inclined upwardly to the upper edge of the trough, and then extended downwardly as at 31 so as to deliver the cans to the receiving ends of the succeeding trackway which has an elevated portion 32 upon which the cans may drop.

In Fig. 4, the discharge ends of the trackways 7 are shown; the lower one delivering the cans to the casing 19 of the lower valve 21, from which the cans may be passed away from the apparatus to any convenient packing or storing point.

The trackways are so arranged that the cans will be readily moved onto the elevated portions 30 thereof by the tubular arms 9 when they are to be discharged through the respective apertures 16 and 17 of the several trackways or to the lower valved discharge structure, and the receiving ends of the succeeding tracks are slightly elevated as at 32 so as to prevent two cans entering any one of the spaces between a pair of the arms 9.

In the present machine, I have illustrated six trackways; three, those numbered 6, being arranged to move the cans inwardly, and three, those numbered 7, being arranged to move the cans outwardly, although it will be understood that a greater or less number of trackways may be employed, depending upon the requirements, and the desired capacity for any given apparatus.

From the valved outlet leading from the lowermost track, the cans may drop onto a delivery trough or runway by means of which they may be fed to any point or to a conveyer, or they may be delivered directly to a conveyer.

The steam drum 8 which carries the radially disposed, tubular arms 9 is rotated by the means described, and the arms are provided on one side with perforations 35 opposite the several runs of cans and through which steam is ejected as the structure rotates. These arms contact with the cans for the purpose of moving the same, and the jets of steam may impinge upon the cans with which the arms are in contact, or such jets may be delivered rearwardly, as may be desired or necessary for the proper heating of the cans. The perforated ends of these tubular arms are preferably separate sections suitably secured to the main members attached to the drum by couplings 36 so that they may move together, and by preference said tubular arms are connected to annular bands 37 and 38 whereby they may be maintained in proper spaced position and held against possible distortion or displacement due to the weight of the cans which they are moving.

It may be readily understood that once the cans are introduced into the cooking apparatus, they are carried through the same automatically, following the helical or convolute trackways and dropping from one to the other as they pass through the apparatus.

The drum 8 is provided at its lower end with a central shaft or pin 39 mounted in a suitable step-bearing 40, which may have a hardened bushing receiving said pin and in axial alinement with the upper tubular steam connection which is also mounted in a bearing 41 to insure the desired rotative movement to effect the travel of the cans. The shaft or pin 39 may be provided with oil apertures 42, as shown, receiving their supply via a pipe 43 from an oil cup 44.

The pipes 15 in the troughs 4 receive steam from a pipe 45 connected to any suitable source of supply, and said pipes are perforated at 15ª so that steam discharged from the same may enter the water in said troughs and cause the same to boil. There will therefore be no water of condensation to be taken care of. In case evaporation from the troughs and the amount of water carried off by the cans is not sufficient to prevent overflow from the troughs; suitable overflow pipes 46 may be connected to the same and lead to a common drain pipe 47 that will insure maintenance of the water at the desired height.

I claim:

1. In a cooker, the combination of a casing, a rotating steam chamber within the same, a series of successively communicating spaced troughs suitably fixed within the casing, pushers carried by the rotating steam chamber, means for feeding the cans from one trough to a lower succeeding trough, means for feeding the cans to the trackway of the uppermost trough, and means for discharging the cans from the lowermost trough.

2. In a cooker, the combination of a casing, a rotating steam chamber centrally disposed within the same, a series of successively communicating spaced troughs suitably fixed within the casing, helical trackways mounted in said troughs; pushers carried by the rotating steam chamber to move cans along said trackways, means at the ends of the several trackways for effecting the delivery of the cans from one trough to a lower succeeding trough, means for feeding the cans to the trackway of the uppermost trough, and means for discharging the cans from the lowermost trough.

3. In a cooker, the combination of a casing, a rotating steam chamber within the same, a series of successively communicating spaced troughs suitably fixed within the casing and surrounding the rotating steam chamber, helical trackways mounted in said troughs, radial steam pipes having exit orifices carried by the rotating steam chamber, inclined ends for the respective trackways whereby the cans may be delivered from one trough to the trackways of a lower succeeding trough, means for feeding the cans to the trackway of the uppermost trough, and means for discharging the cans from the lowermost trough.

4. In a cooker, the combination of a casing, a plurality of annular troughs disposed within the casing, helical or convolute tracks mounted within the respective troughs, said troughs adapted to contain water; means for heating said water, and means for moving the cans around the troughs and discharging the cans from one trough to a succeeding lower trough, said means including elevated portions at the receiving and discharge ends of the helical tracks.

5. In a cooker, the combination of a casing, a plurality of annular troughs disposed within the casing, helical or convolute tracks mounted within the respective troughs, said troughs adapted to contain water, means for heating said water, a rotatable steam chamber within the casing, arms carried by said steam chamber for moving the cans and for discharging the cans from one trough to a succeeding trough, and elevated portions at the discharge and receiving ends of the helical tracks.

6. In a cooker, the combination of an inclosing casing, a plurality of annular troughs disposed within the casing, helical or convolute tracks mounted within each of said troughs, said troughs adapted to contain water, steam pipes in said troughs for heating said water, a rotatable steam chamber within the casing, hollow steam conveying arms radiating from said chamber for moving the cans along the tracks, means for discharging the cans from one trough to a succeeding lower trough, said arms having steam outlet orifices, elevated portions at the discharge ends of the helical tracks whereby the cans can be lifted from the troughs by the radial arms, and elevated portions at the receiving ends of the tracks upon which the cans are delivered.

7. The combination, in a cooker, of a casing, a plurality of troughs mounted therein, helical trackways disposed in said troughs, a rotating steam drum within the casing, and steam pipes radiating from said drum and acting as pushers, said steam pipes having orifices whereby steam may be discharged upon the cans traveling along the trackways.

8. The combination, in a cooker, of a casing, a plurality of troughs mounted therein, helical tracks disposed in said troughs, means for feeding cans to said tracks, a rotating steam drum, steam pipes radiating from said drum and acting as pushers for moving the cans along said tracks, and rings connecting and staying the outer ends of said pipes.

9. The combination, in a cooker, of a plurality of troughs adapted to contain water, helical trackways mounted in said troughs along which the cans may travel, means for moving the cans along said trackways, elevated sections at the ends of said trackways whereby the cans may be guided out of the same, inclined runways for the passage of cans to the succeeding troughs and trackways, and elevated portions at the receiving ends of the trackways upon which the cans are delivered.

10. In a cooker, the combination of a casing, a rotating steam chamber or drum within the same, a trackway suitably fixed within the casing, tubular pushers carried by the rotating drum and discharging steam therefrom adjacent the cans, and means for feeding oil to said steam for discharge upon the cans with the steam.

11. In a cooker, the combination of a casing, a rotating steam chamber or drum centrally disposed within the same, a rotating steam pipe connected to said drum, a trough suitably fixed within the casing, a trackway mounted in said trough, tubular pushers carried by the rotating steam chamber to move cans along said trackway, said pushers communicating with said steam drum and being perforated whereby steam may be discharged therefrom adjacent the cans, an oil discharging device carried by the rotating steam pipe whereby oil may be delivered with steam adjacent the cans, means for feeding cans to the trackway, and means for discharging cans therefrom.

12. In a cooker, the combination of a casing, a rotating steam chamber or drum within the same, a trough suitably fixed within the casing and surrounding the rotating drum, a helical trackway mounted in said trough, radially disposed steam pipes having exit orifices carried by the rotating drum, said radial pipes contacting with the cans to move the same, an inclined end for the trackway whereby the cans may be delivered from the trough, means for feeding the cans to the trackway, and means for discharging the cans received from said trough.

13. In a cooker, the combination of a casing, a plurality of annular troughs disposed within the casing, helical or convolute tracks mounted within the respective troughs, said troughs adapted to contain water, apertured steam pipes connected with a suitable source of supply for heating said water, and means for moving the cans around the tracks within the troughs and discharging the cans from one trough to a succeeding lower trough, said means including elevated portions at the receiving and discharge ends of the helical tracks.

14. In a cooker, the combination of a casing, a plurality of annular troughs disposed within the casing, helical or convolute tracks mounted within the respective troughs, said troughs adapted to contain water, apertured steam pipes connected with a suitable source of supply for heating said water, a rotatable steam drum within the casing, tubular steam discharging arms carried by said steam drum for moving the cans and for discharging the cans from one trough to a succeeding lower trough, and elevated portions at the discharge and receiving ends of the helical tracks whereby the cans are raised out of and lowered into the bodies of water within the troughs.

15. In a cooker, the combination of an inclosing casing, a plurality of annular troughs disposed within the casing, helical or convolute track ways mounted within each of said troughs, said troughs adapted to contain water, apertured steam pipes in said troughs for heating said water, a rotatable steam drum within the casing, hollow steam conveying arms radiating from said drum for moving the cans along the trackways, said arms being apertured whereby steam may be discharged therefrom adjacent the cans, means for discharging the cans from one trough to a succeeding lower trough, elevated portions at the discharge ends of the helical trackways whereby the cans may be moved out of the troughs by the radial arms, elevated portions at the receiving ends of the tracks upon which the cans are delivered, and means for oiling the cans as they are moved through the cooking apparatus.

16. The combination, in a cooker, of a casing, a trough mounted therein, a helical trackway disposed in said trough, a rotating steam drum within the casing, steam pipes radiating from said drum and acting as pushers, said steam pipes having orifices whereby steam may be discharged upon or adjacent the cans traveling along the trackway, and means for discharging oil simultaneously with the steam.

17. The combination, in a cooker, of a casing, a plurality of troughs mounted therein, helical trackways disposed in said troughs, a rotating steam drum, steam pipes radiating from said drum and acting as pushers, said steam pipes having orifices whereby steam may be discharged upon or adjacent the cans traveling along the trackways, and a plurality of concentrically disposed rings connecting and staying the outer apertured portions of said radial pipes.

18. In a cooker, the combination of a casing, a rotating steam chamber within the same, a trough suitably fixed within the casing, means for feeding cans to said trough, pushers for said cans carried by the rotating steam chamber, and provision for permitting discharge of the cans from said trough.

19. In a cooker, the combination of a casing, a rotating steam chamber centrally disposed within the same, a trough suitably fixed within the casing, a helical trackway mounted in said trough, pushers carried by the rotating steam chamber to move cans along said trackway, means for feeding cans to the trackway, and means at the end of the trackway for effecting delivery of the cans from said trough.

20. The combination, in a cooker, of a casing, a trough mounted therein, a trackway disposed in said trough, a rotating steam drum within the casing, steam pipes having exit orifices radiating from said drum and acting as pushers, means for feeding cans to said trackway, and means for effecting delivery of the cans from the end of said trackway.

21. In a cooker, the combination of a casing, a rotating steam chamber within the same, a trough suitably fixed within the casing and surrounding the rotating steam chamber, a trackway mounted in said trough, radial steam pipes having exit orifices carried by the rotating steam chamber, means for feeding cans to said trackway, and an inclined end for the trackway whereby the cans may be delivered therefrom.

22. The combination, in a cooker, of a casing, a trough mounted therein, a helical trackway disposed in said trough, a rotating steam drum within the casing, and steam pipes radiating from said drum and acting as pushers, said steam pipes having orifices whereby steam may be discharged upon or adjacent the cans traveling along the trackway.

23. In a cooker, the combination of a casing, an annular trough disposed within the casing, a helical track mounted within said trough, said trough adapted to contain water, means for heating said water, and means for moving the cans around the trough and discharging the same therefrom, said means including an elevated portion at the discharge end of the helical track.

24. In a cooker, the combination of a casing, an annular trough disposed within the casing, a helical track mounted within said trough, said trough adapted to contain water, means for heating said water, a rotatable steam chamber within the casing, arms carried by said steam chamber for moving the cans and for discharging the cans from the trough, and an elevated portion at the discharge end of the helical track.

25. In a cooker, the combination of an inclosing casing, an annular trough disposed within the casing, a helical track mounted within said trough, said trough adapted to contain water, steam pipes in said trough for heating said water, a rotatable steam chamber within the casing, hollow steam conveying arms radiating from said chamber for moving the cans along the track, means for feeding cans to the trough, said arms having steam outlet orifices, and an elevated portion at the discharge end of the helical track whereby the cans can be lifted from the trough by the radial arms.

26. The combination, in a cooker, of a casing, a trough mounted therein, a trackway disposed in said trough, a rotating steam drum, steam pipes radiating from said drum and acting as pushers, said steam pipes having orifices whereby steam may be discharged upon or adjacent the cans traveling along the trackway, and a concentrically disposed ring connecting and staying the outer ends of said radial pipes.

27. In a cooker, the combination of a casing, an annular trough disposed within the casing, a helical track mounted within said trough, said trough adapted to contain water, means for heating said water, means for moving the cans around the trough and discharging the same therefrom, said means including an elevated portion at the discharge end of the helical track, and an overflow pipe leading from said trough whereby a constant level of water may be maintained therein.

28. In a cooker, the combination of an inclosing casing, an annular trough disposed within the casing, a helical track mounted within said trough, said trough adapted to contain water, apertured steam pipes connected with a suitable source of supply and located in said trough for heating said water, a rotatable steam chamber within the casing, hollow steam conveying arms radiating from said chamber for moving the cans along the track, means for feeding cans to the trough, said arms having steam outlet orifices, an elevated portion at the discharge end of the helical track whereby the cans can be lifted from the trough by the radial arms, and an overflow pipe leading from said trough whereby a constant level of water may be maintained therein.

29. In a cooker, the combination of a casing, a steam chamber journaled within the same, means for rotating said steam chamber, a trough suitably fixed within the casing, means for feeding cans to said trough, pushers for said cans carried by the rotating steam chamber, and provision for permitting discharge of the cans from said trough.

30. In a cooker, the combination of a casing, a steam chamber centrally journaled within the same, means for rotating said steam chamber, a trough fixed within the casing, a helical trackway mounted in said trough, radial arms carried by the steam chamber and rotating therewith to push cans along said trackway, means for feeding cans to the trackway, and means at the end of the trackway for effecting delivery of the cans from said trough.

FRANK P. SOUDER.